United States Patent [19]

Capaul

[11] Patent Number: 4,627,199

[45] Date of Patent: Dec. 9, 1986

[54] TACKABLE ACOUSTICAL STRUCTURE

[76] Inventor: Raymond W. Capaul, Rte. #3, Wildwood Dr., Box 643, Aurora, Ill. 60504

[21] Appl. No.: 653,364

[22] Filed: Sep. 24, 1984

[51] Int. Cl.⁴ .................. B32B 17/06; E04B 1/82; E04B 1/84; E04C 2/26
[52] U.S. Cl. .................... 52/145; 52/811; 181/290; 181/291; 181/294; 428/448
[58] Field of Search ............... 52/144, 145, 811, 813; 181/284, 290, 291, 294; 40/569; 434/430, 150, 153; 160/DIG. 7; D19/52; D25/80; 296/31 P, 164; 428/75, 74, 458, 282, 452, 448, 229

[56] References Cited

U.S. PATENT DOCUMENTS

| | | | |
|---|---|---|---|
| 2,030,157 | 2/1936 | Schlenker | 52/145 X |
| 2,077,713 | 4/1937 | Ross et al. | 52/145 |
| 2,350,513 | 6/1944 | Leadbetter | 52/145 |
| 3,470,977 | 10/1969 | Shannon | 181/284 |
| 3,513,065 | 6/1970 | Pearson | 428/229 X |
| 3,589,975 | 6/1971 | Andrews et al. | 428/458 |
| 3,654,067 | 4/1972 | Klein | 428/448 |
| 3,908,062 | 9/1975 | Roberts | 428/282 |
| 4,133,123 | 1/1979 | Anderson | D19/52 X |
| 4,248,325 | 2/1981 | Georgopoulos | 181/284 |
| 4,402,151 | 9/1983 | Medow | 434/430 X |

Primary Examiner—Stuart S. Levy
Assistant Examiner—Lynn M. Sohacki
Attorney, Agent, or Firm—Wallenstein, Wagner, Hattis, Strampel & Aubel, Ltd.

[57] ABSTRACT

A tackable acoustical structure comprising a tack pin retaining layer, a sound absorptive layer, and a metal foil septum separating the tack pin retaining layer and the sound absorptive layer. The structure can be formed into wall panels having a flame spread index which qualifies them as a Class A rated building materials.

5 Claims, 4 Drawing Figures

TACKABLE ACOUSTICAL STRUCTURE

TECHNICAL FIELD

The present invention relates to a tackable acoustical wall panel or board having excellent tackable properties, and which has a flame spread index which qualifies it as a Class A rated building material.

BACKGROUND OF THE PRIOR ART

The most commonly used materials to provide a tackable surface in an office environment are cork and compressed wood fiber. While such materials have excellent tack retention properties, they are very poor sound absorbers. What is more, they are not fire resistant, cork, for example, having a flame spread index of well over 100. Efforts to provide a tackable surface having improved properties, especially from the standpoint of sound absorption, have involved the use of high density fiberglass. However, as pointed out in U.S. Pat. No. 4,248,325, fiber glass is unsatisfactory as a tackable surface. In an attempt to overcome the shortcomings of fiber glass as a tackable surface, U.S. Pat. No. 4,248,325 discloses the use of a wire mesh screen positioned a distance between two layers of fiber glass such that a tack pin will pass through an opening in the screen when the pin enters one of the fiber glass layers. This arrangement, however, does not in any way alter the poor retention, or pull-out properties of the fiber glass layer in which the tack pin is positioned, and, therefore, the arrangement is unsatisfactory for supporting large, or heavy, prints, drawings, plans, maps, and the like.

BRIEF SUMMARY OF THE INVENTION

The tackable acoustical structure of this invention is characterized not only by its excellent tack retention properties, but, also by its surface burning properties which qualify it as a Class A rated building material. So far as can be determined, the structure of this invention is the only, and first, tackable structure so rated. More specifically in this latter connection, the structure of the present invention, when tested in accordance with the American Society for Testing and Materials Standard Test Method for "Surface Burning Characteristics of Building Materials", identified as ASTM E 84-81a, and also known as the Steiner Tunnel Test, had a flame spread index in the range of about 10 to about 20. In order for a material to receive a Class A rating under this test method, it must have a flame spread index of from 0 to 25.

In brief, the structure of this invention comprises a layer of a tack pin retaining material, a layer of an acoustical or sound absorption material, and a continuous layer or film of a metal foil. The combined thickness of the acoustical or sound absorption material and the metal foil is such that the pointed shank or pin of a tack can pass therethrough and enter the layer of the tack pin retaining material. In a preferred embodiment of the invention, the outer surface of the structure is provided with a decorative surface or facing. The structure advantageously is fabricated in the form of panels which are floor-to-ceiling in length, and which have a width such as to enable them to be easily handled by a single installer. An entire room can be panelled with the tackable panels to provide a sound proofed enclosure having total tackable surface area.

DETAILED DESCRIPTION OF INVENTION

Figure 3:
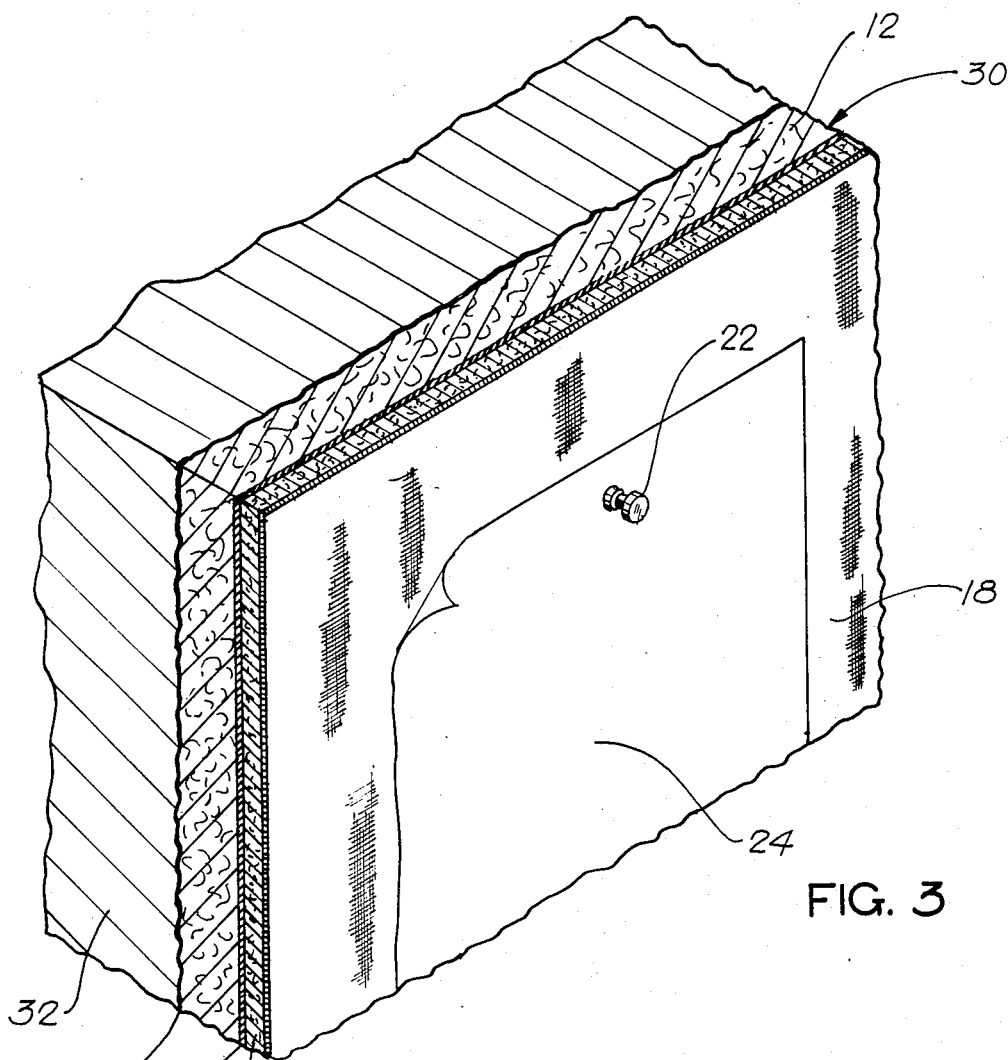
FIG. 3 is an enlarged fragmentary view in perspective of a wall panel formed from the structure installed on a supporting wall surface.
Figure 4:
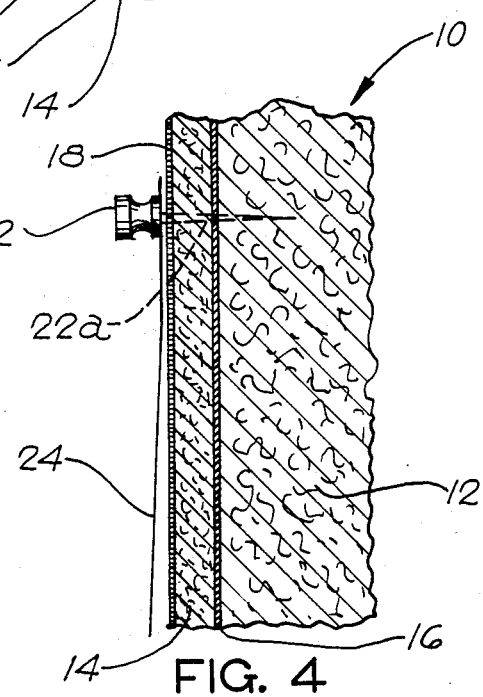
FIG. 4 is an enlarged fragmentary vertical sectional view of the structure of this invention with a tack positioned thereon.

Referring, now, in particular, to FIGS. 3 and 4 of the drawing, the embodiment of the structure shown, and designated generally by reference numeral 10, comprises a tack pin retaining layer 12, a sound absorption layer 14, and a septum formed of a continuous layer, film or sheet of a metal foil 16 positioned between the layers 12 and 14. A decorative surface or facing 18 is provided on the exposed, or outer, surface of the sound absorption layer 14.

The tack pin retaining layer 12 can be fabricated from various materials, both organic and inorganic, having tack pin retention properties. An especially preferred material is wood fiber board. While the thickness and weight of the layer is somewhat variable, the generally optimum objectives of the invention are attained with a tack pin retaining layer having a thickness of about $\frac{3}{8}$ inch to about $\frac{5}{8}$ inch, preferably about $\frac{1}{2}$ inch, and a weight ranging from about 0.5 to about 1.5, preferably about 0.8 pound per square foot.

The sound absorption layer 14 of the structure 10 can be formed from a number of acoustical, or sound absorbing, and fire resistant materials, including glass fibers, mineral wools such as slag or rock wool, as well as synthetic plastic filament or spun fibers, and mixtures of the foregoing. The preferred material is a glass fiber laminate which has been impregnated with an uncured, or partially cured, thermosetting bonding agent such as a phenolic resin. The thickness of the layer 14 advantageously is about 1/16 inch to about 3/16 inch, preferably about $\frac{1}{8}$ inch. The density of the layer 14 desirably will be of the order of about 8 to about 16, preferably about 12 pounds per cubic foot.

The septum, or continuous metal foil layer, film or sheet 16 may be formed of aluminum or lead, aluminum being preferred. The thickness of the layer or film can range from about 0.5 mil to about 2 mils, preferably about 0.7 to about 1 mil.

Figure 2:
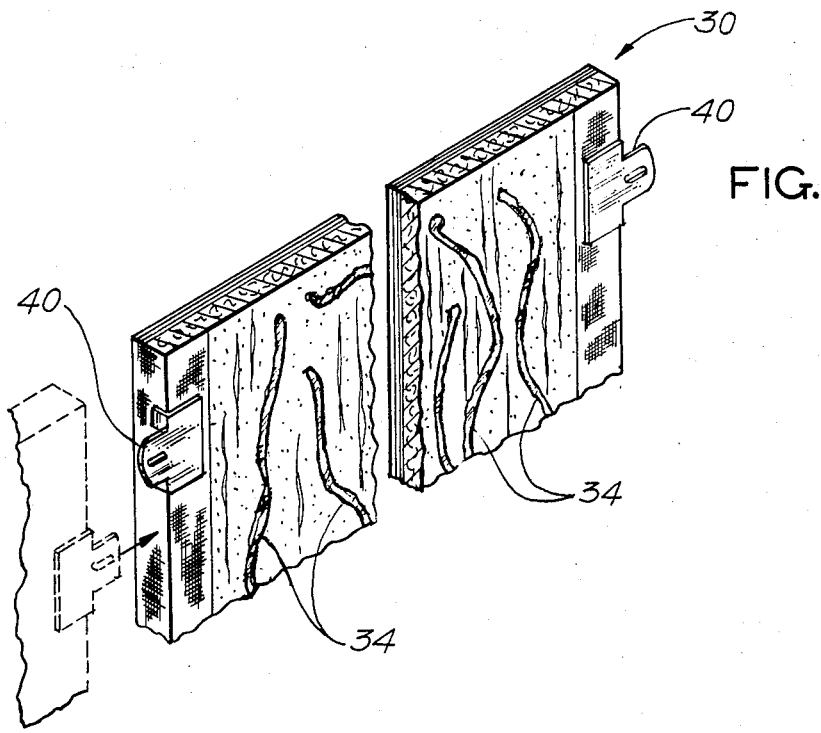
FIG. 2 is a fragmentary view in perspective of the back side of a panel of the type being installed as shown in FIG. 1.

The decorative facing 18 desirably is formed of an open-weave synthetic fabric which is inherently fire resistant, or which has been chemically treated to make it fire resistant. Preferred facing materials are woven, filament or spun plastic sheet materials such as polypropylenes, vinyls and polyesters, and glass fibers. Polypropylene based materials are preferred due to their self-sealing, or memory, properties. The weave of the facing should be such as to permit sound energy to easily pass through to the sound absorbing layer 14, and to not impede the passage of a tack pin into the structure. The thickness of the facing 18 advantageously is from about 1 mil to about 8 mils, preferably about 4 or 5 mils. As best shown in FIG. 2, the margins 18a of the facing 18 desirably cover the edges of a panel 20 formed from the structure to give the panel a finished appearance. The margins 18a can be adhered to the back surface of the tack pin retaining layer 12.

In those instances where the sound absorption layer 14 comprises glass fibers impregnated with an uncured, or partially cured, thermosetting bonding agent such as a phenolic resin, the facing 18 and the sheet or film of the metal foil 16 can be adhered to the layer 14 either separately, or simultaneously, by placing the layer 14, the facing 18 and the metal foil 16, between heated platens. Sufficient heat and pressure are applied to cure the bonding agent and to form the stacked materials into a rigid, integrated multi-ply sheet which can be adhered to the tack pin retaining layer 12. Any of a variety of adhesive materials can be employed to bond the metal foil film 16 to the layer 12. A preferred adhesive is a water based latex available commercially under the designation "EA 7601" (Borden).

In FIGS. 3 and 4 of the drawing, a conventional tack 22 is shown supporting a sheet 24 of informational material on the finished structure 10 of this invention. The tack pin 22a of the tack 22 has passed through the facing 18, the sound abosrption layer 14, the metal foil film 16, and is embedded in the tack pin retaining layer 12. As indicated hereinabove, the combined thickness of the facing 18, the layer 14 and metal foil film 16 is such that the tack pin of a standard or conventional tack can pass through them and penetrate the layer 12 a sufficient distance to firmly retain the tack in position on the structure irrespective of the weight or size of the informational material tacked to the structure.

Figure 1:
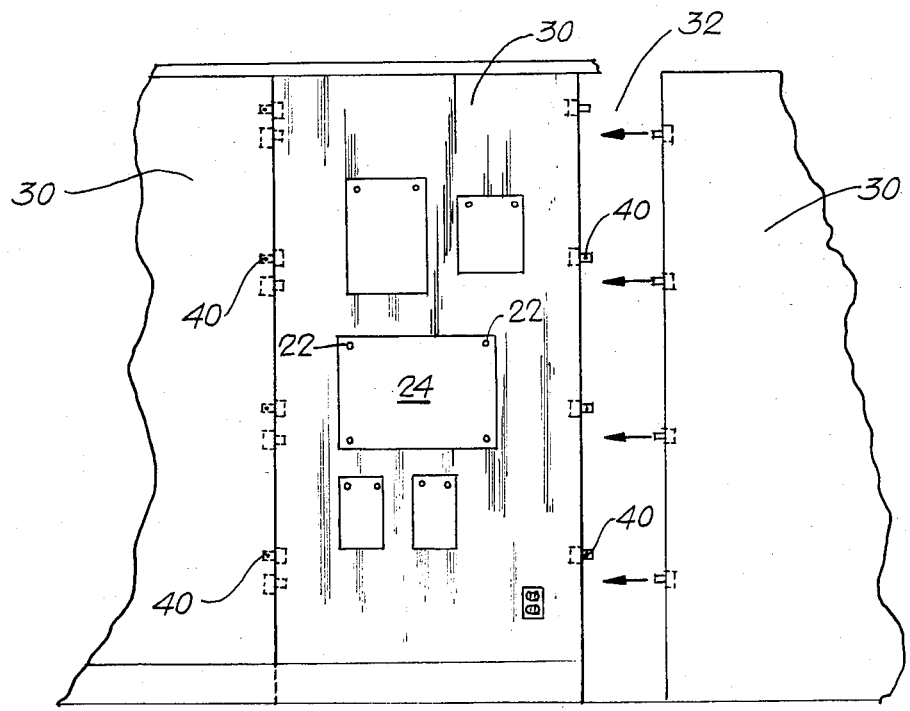
FIG. 1 is a front view in elevation of panels formed from the structure of the present invention being installed as floor-to-ceiling wall panelling in a room.

While the structure of this invention can be formed into wall panels of any desired dimensions, panels measuring 4 feet by 8 or 10 feet are preferred. Panels of this size can be conveniently used to construct floor-to-ceiling enclosures of the open-plan type, for example, and are easily handled by a single installer. In FIG. 1 of the drawing, wall panels 30 formed from the structure are shown being installed on a plasterboard wall 32. The panels are secured to the plasterboard surface by means of an adhesive 34 applied to the back of the panels as illustrated in FIG. 2. The panels may be held in position on the plasterboard by means of finishing nails driven into the panels. Clips, such as the clips 40, advantageously are secured to the margins of the panels to enable the sides of the panels to be positioned in snug, abutting relation to one another thereby giving the installation an integrated, unitary and highly attractive appearance.

While for purposes of illustration a respresentative embodiment of the structure of this invention has been illustrated and described, modifications and variations of said embodiment may become apparent to those skilled in the art upon reference to this disclosure and, accordingly, the scope of the invention is to be determined by the appended claims.

What is claimed is:

1. A tackable acoustical structure, consisting essentially of: a layer of tack pin retaining material formed of compressed wood fiber; a layer of a sound absorption material formed of compressed glass fibers or rock wool; and a continuous, thin film of a tack pin penetrable metal foil between and abutting both the tack pin retaining layer and the sound absorption layer, wherein a substantially fire-resistant decorative facing is provided on the exposed surface of the sound absorption layer, the sound absorption layer and the film of metal foil being characterized in that their combined thickness is such that the pin of a tack can pass therethrough and enter the tack pin retaining layer thereby enabling a tack to be firmly, yet releasably, secured on the structure, the tackable acoustical structure having a flame spread index below about 25.

2. A structure according to claim 1 wherein the metal foil film is formed of aluminum.

3. A structure according to claim 1 wherein the layer of wood fiber has a thickness of about ⅜ to about ⅝ inch and a weight of about 0.5 to about 1.5 pounds per square foot.

4. A structure according to claim 1 wherein the layer of fiber glass has a thickness of about 1/16 to about 3/16 inch, and a density of about 8 to about 16 pounds per cubic foot.

5. A structure according to claim 1 wherein the film of metal foil has a thickness of about 0.7 to about 1.5 mils.

* * * * *